(12) United States Patent
Bignami et al.

(10) Patent No.: US 12,466,146 B2
(45) Date of Patent: Nov. 11, 2025

(54) APPARATUS AND METHOD TO PRODUCE CLOSING SYSTEMS FOR CONTAINERS

(71) Applicant: I.M.A. INDUSTRIA MACCHINE AUTOMATICHE S.P.A., Ozzano Dell'emilia (IT)

(72) Inventors: Matteo Bignami, Ozzano Dell'emilia (IT); Pierluigi Castellari, Ozzano Dell'emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 138 days.

(21) Appl. No.: 18/287,091

(22) PCT Filed: Apr. 19, 2022

(86) PCT No.: PCT/IT2022/050102
§ 371 (c)(1),
(2) Date: Oct. 16, 2023

(87) PCT Pub. No.: WO2022/224287
PCT Pub. Date: Oct. 27, 2022

(65) Prior Publication Data
US 2024/0190097 A1 Jun. 13, 2024

(30) Foreign Application Priority Data
Apr. 20, 2021 (IT) .................. 102021000009863

(51) Int. Cl.
*B29C 65/36* (2006.01)
*B29C 65/78* (2006.01)
(Continued)

(52) U.S. Cl.
CPC ...... *B29D 99/0096* (2013.01); *B29C 65/3656* (2013.01); *B29C 65/368* (2013.01);
(Continued)

(58) Field of Classification Search
CPC ............ B29D 99/0096; B29C 65/3656; B29C 65/368; B29C 65/7847; B29C 65/7879
(Continued)

(56) References Cited

U.S. PATENT DOCUMENTS 8,104,250 B2 * 1/2012 Abrahamsen ..... B29C 66/72328
53/DIG. 2
10,556,403 B2 2/2020 Cavanna et al.
2008/0035600 A1 2/2008 McGeough et al.

OTHER PUBLICATIONS

International Search Report and Written Opinion of PCT/IT2022/050102 dated Jul. 15, 2022, 12 pages.

* cited by examiner

*Primary Examiner* — James D Sells
(74) *Attorney, Agent, or Firm* — Rankin, Hill & Clark LLP

(57) ABSTRACT

An apparatus (10) and a method are described for producing a closing system (100) for containers comprising an anti-tampering strip (101) configured to be attached to an opening of a container, and a re-closable closing body (102), configured to hermetically close said containers. The apparatus (10) comprises a welding and deformation station (11) in which it is provided to weld a barrier element (108) to the re-closable closing body (102) and to fold a flexible annular portion (109) of the anti-tampering strip (101) back toward the inside of the closing system (100) while the latter is stationary in a same predetermined position in the welding and deformation station (11).

16 Claims, 3 Drawing Sheets

(51) Int. Cl.
*B29D 99/00* (2010.01)
*B29L 31/56* (2006.01)
(52) U.S. Cl.
CPC ...... *B29C 65/7847* (2013.01); *B29C 65/7879* (2013.01); *B29L 2031/565* (2013.01)
(58) Field of Classification Search
USPC .......................................................... 156/69
See application file for complete search history.

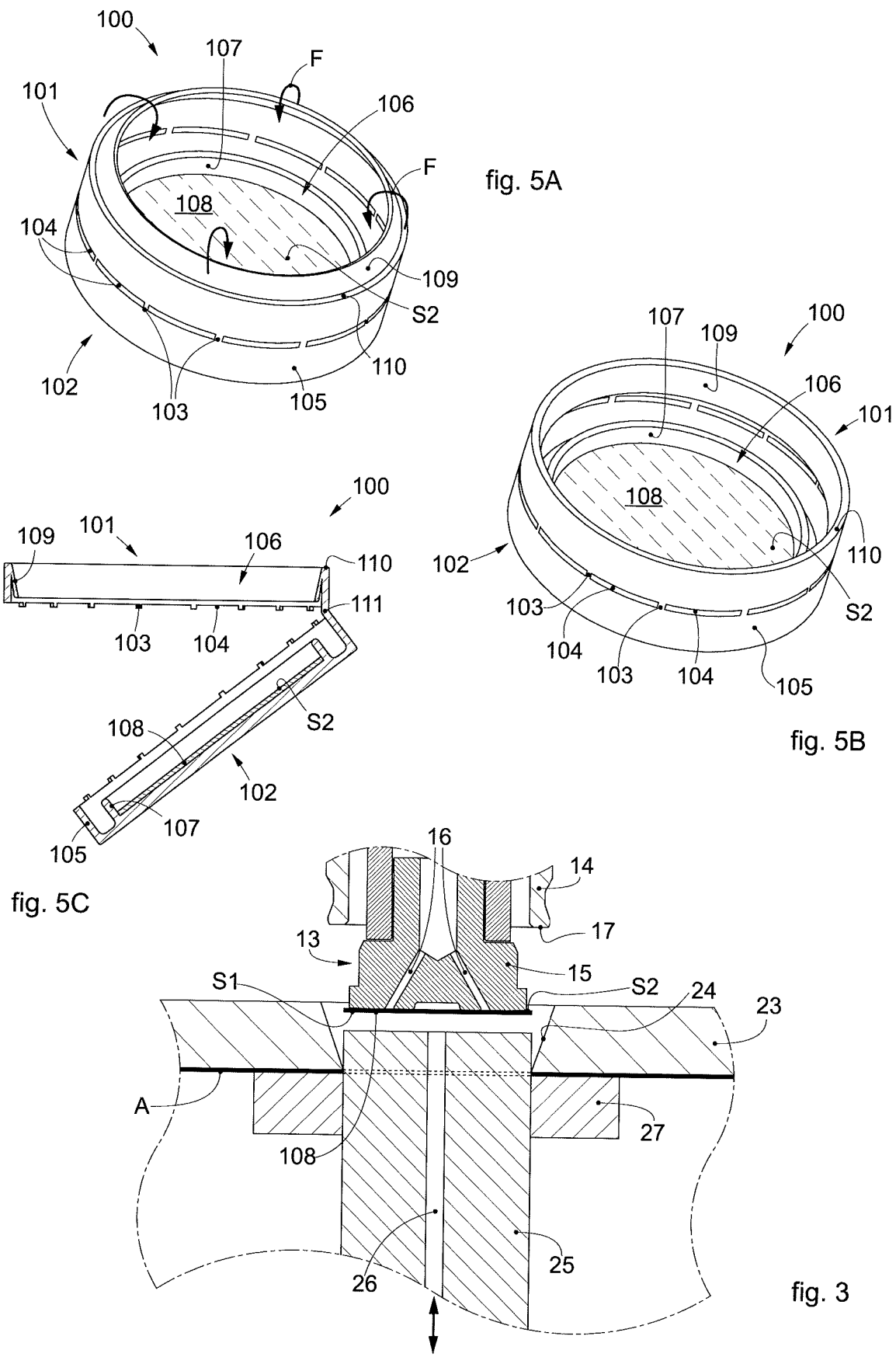

APPARATUS AND METHOD TO PRODUCE CLOSING SYSTEMS FOR CONTAINERS

FIELD OF THE INVENTION

The present invention concerns an apparatus and a method to produce hermetic sealing systems, preferably re-closable, for containers—preferably made of laminated polylaminate materials—which are able to contain, by way of a non-restrictive example, liquid, semi-liquid or pasty substances, preferably of a food, cosmetic or pharmaceutical nature.

The apparatus and method of the present invention are able to form closing systems provided with a barrier element disposed on the internal side of the system which faces toward the mouth of the container, as well as with an anti-tampering ring that detects the first opening of the containers.

BACKGROUND OF THE INVENTION

Machines are known in the state of the art for producing closing systems for containers that are usually configured as re-closable caps that engage with the neck surrounding the opening of a container, from which the product contained therein can exit.

The reciprocal engagement between the cap and the neck of the container can be obtained by means of a thread in the case of screw caps, or by means of mechanical interference in the case of caps with pressure closing.

In general, it is provided to produce the caps by means of molding operations of plastic or metal materials which are able to deform by compression respectively the dose of resin or the metal sheet in order to give the cap the desired shape and characteristics.

The machines suitable for making these products, which have a very low economic unit value, operate at high or very high speeds to make production economically convenient.

The caps in question comprise a barrier element, also called a "liner", configured to keep the container hermetically sealed so as to prevent oxygen from entering inside it, inducing degradation of the product and ruining its organoleptic characteristics. Examples of this type of caps are described in US patent documents US 2008/0035600 and U.S. Ser. No. 10/556,403.

Typically, the barrier element can consist of a laminar layer of aluminum, in particular shaped like a disk, or of an element made of plastic material. In both cases, the barrier element usually adheres to the internal face of the cap which faces—when the container is in the closed condition—toward the opening of the container in order to hermetically seal it.

The adhesion of the barrier element to the cap is typically obtained by the action of heat which, by heating the barrier element, allows to activate a layer of adhesive substance disposed upon it so as to make it adhere to the surface of the cap below it. This operation is particularly delicate because on the one hand the quantity of heat must be sufficient to ensure a firm adhesion of the barrier element to the cap and on the other hand an excessive quantity of heat, which damages the barrier element and/or the cap itself, must be prevented.

Another characteristic of caps known in the state of the art is that they comprise an anti-tampering strip which reveals the integrity of the container. Usually, the anti-tampering strip is configured as an annular element which is attached around the neck of the container and is joined to the re-closable cap by means of a plurality of breakable connections, called in jargon "bridges". When the container is first opened, the breakable elements break and the cap is separated from the anti-tampering strip, which remains anchored to the neck of the container so as to allow an immediate visual confirmation indicating whether the container has already been opened for a first time or not.

The production of the anti-tampering strip and the association of the barrier element with the cap are operations that require dedicated processing steps in correspondence with respective processing stations.

It is obvious that the creation of these closing systems increases the complexity, the overall sizes and the overall costs of the system for their production, ultimately increasing the unit cost thereof.

There is therefore a need to perfect an apparatus and a method to produce closing systems for containers that can overcome at least one of the disadvantages of the state of the art.

In particular, one purpose of the present invention is to make available an apparatus for producing closing systems that has limited overall sizes and can, if necessary, be easily integrated into a plant to produce such systems.

Another purpose of the present invention is to make available an apparatus, and to perfect a method, for producing closing systems for containers, able to achieve high or very high productivity, in the order of magnitude of at least several hundred units produced per minute, or even more.

Another purpose is to make available an apparatus, and to perfect a method, for producing closing systems for containers able to guarantee optimal adhesion of the barrier element to the closing system.

Another purpose is to make available an apparatus, and to perfect a method, which allows to intervene effectively on the anti-tampering strip of the closing system in order to prepare it in an optimal manner for subsequent attachment to the neck of the container.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, the invention concerns an apparatus for producing closing systems for containers.

The closing systems in question comprise an anti-tampering strip configured to be attached to an opening of a container, and a closing body configured to close the containers hermetically. Preferably, the closing body is hinged to the anti-tampering strip so that the closing body can rotate between a position in which the container is open, in which it is distanced from the anti-tampering strip, and a position in which the container is closed, in which the closing body is alongside the strip.

According to one aspect, the apparatus comprises:
a forming station configured to form barrier elements starting from a sheet, wherein the barrier elements are laminar, with a shape and sizes correlated to those of the closing body;
a transport system comprising at least one gripping unit configured to hold one of the closing systems as above and to move along a feed path, which extends between an inlet station and an outlet station;

a welding and deformation station disposed along the feed path between the inlet station and the outlet station.

The welding and deformation station is configured to weld a barrier element to the closing body and to shape at least one flexible annular portion of the anti-tampering strip.

With the expression "barrier element" we mean to characterize this element in a functional way, since its presence allows the closing system to close the container with a hermetic seal, constituting a barrier to the entry of oxygen inside it, which could degrade the organoleptic characteristics of the product contained therein and significantly damage it.

According to possible embodiments, the barrier element can be configured as a flat or laminar element, for example with a circular shape, made as an aluminum disc. However, barrier elements with different shapes and/or made of other suitable materials, even different from aluminum, should not be excluded.

According to one aspect, the apparatus comprises a manipulation member configured to pick up the barrier element in the forming station and take it in the welding and deformation station, and to subsequently attach the barrier element to the closing body, and a deformation member configured so that it can be driven between an inactive position, distant from the closing system, and a work position. In the latter, the deformation member presses into contact on a flexible annular portion of the anti-tampering strip in order to fold it back inside the closing system.

According to one aspect, the apparatus comprises a control unit connected to the manipulation member and to the deformation member, and programmed to command the functioning of the manipulation member and of the deformation member in a coordinated manner, so that such members respectively attach the barrier element onto the closing body and exert a pressure on the flexible annular portion in the welding and deformation station while the gripping unit is stationary in a same predetermined position, holding the closing system.

An advantage of the apparatus according to the present invention is that it is more compact and has reduced overall sizes compared to known solutions, thanks to the fact that it integrates both the welding of the barrier element to the closing body and also the shaping operations to be performed on the anti-tampering strip in a single station.

The apparatus according to the present invention therefore advantageously allows to produce closing systems provided with the desired characteristics of hermeticity and safety.

According to another aspect of the apparatus, the barrier element is attached to the closing body by means of induction welding, when the barrier element is placed in contact with the closing body and kept pressed against the latter by the manipulation member.

To this end, according to possible embodiments described here, the welding and deformation station comprises a support plane for the closing systems in proximity to which there are disposed electromagnetic induction welding means.

This configuration of the apparatus is advantageous because it allows to activate the layer of adhesive substance that allows the barrier element to be attached to the closing body.

In some embodiments of the closing systems, another layer of adhesive substance is also provided on the side of the barrier element exposed to view, which during use faces the mouth of the container. In these embodiments, the mouth can be closed in turn by another barrier element, for example similar in structure to the barrier element attached to the closing body.

This other barrier element usually has to be removed manually by the user when opening the container for the first time. To prevent the dispersion of this other barrier element into the environment, some containers can provide its automatic removal when the closing body is first opened. This can be achieved by making the barrier element attached to the closing body adhere to the other barrier element placed to close the mouth, thanks to the presence of the other layer of adhesive substance mentioned above.

The apparatus according to the present invention is also suitable to produce these embodiments of the closing systems.

In fact, the attachment of the barrier element to the closing body by means of electromagnetic induction welding has the advantage of preventing the simultaneous activation of the other layer of adhesive substance able to adhere, in a subsequent moment, to the other barrier element placed to close the mouth of the container.

It is quite clear that—if the welding step that attaches the barrier element to the closing body also activated the other layer of adhesive substance able to make the two barrier elements adhere to each other—this other layer would lose, in whole or in part, its adhesion properties, effectively making the subsequent reciprocal adhesion of the two barrier elements impossible.

According to another aspect, the forming station can be configured to simultaneously form a plurality of barrier elements, which are disposed along an oblique line with respect to a feed sense of the sheet of material.

This embodiment of the forming station is advantageous since it allows to minimize the processing waste, so as to optimize the consumption of the sheet material and reduce its costs.

According to another aspect of the present invention, a method is provided to produce a closing system for containers comprising the steps of:

forming, in a forming station, starting from a sheet, a barrier element with a shape and sizes correlated to those of the closing body;

transporting a plurality of closing systems along a feed path, which extends between an inlet station and an outlet station;

picking up a barrier element from the forming station by means of a manipulation member, taking the barrier element picked up in the forming station toward a welding and deformation station disposed along the feed path between the inlet station and the outlet station, welding the barrier element to the re-closable closing body in a welding and deformation station, by means of the manipulation member, wherein the welding step provides to attach the barrier element to a wall of the closing bod in a stable manner, shaping at least one portion of the anti-tampering strip in the welding and deformation station by means of a deformation member.

According to one aspect of the method in accordance with the present invention, the shaping step as above provides that the deformation member exerts a pressure on a flexible annular portion of the anti-tampering strip configured to be attached to the container, so as to fold the annular flexible portion back inside the closing system, toward the wall of the closing body, while the closing system is kept stationary in a same predetermined position in the welding and deformation station.

According to another aspect of the method, the attachment of the barrier element to the wall of the closing body occurs by means of electromagnetic induction welding.

According to another aspect of the method, the attachment of the barrier element to the closing body by the manipulation member occurs while the flexible annular portion is folded back into the closing system by the deformation member.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 3 is a partial and schematic section view of a forming station comprised in the apparatus of FIG. 1;

FIGS. 5A and 5B are schematic, top perspective views of a closing system for containers obtainable by means of the apparatus of FIG. 1, according to the method in accordance with the teachings of the present invention, in which the closing system is shown in a closing position, respectively before and after the operation of shaping a portion of an anti-tampering strip comprised in the closing systems as above;

FIG. 5C is a schematic section view of the closing system of FIGS. 5A and 5B, in which the closing system is shown in an opening position.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF AT LEAST ONE EMBODIMENT

We will now refer in detail to the possible embodiments of the invention, of which one or more examples are shown in the attached drawings, by way of a non-limiting illustration. The phraseology and terminology used here is also for the purposes of providing non-limiting examples.

Figure 1:
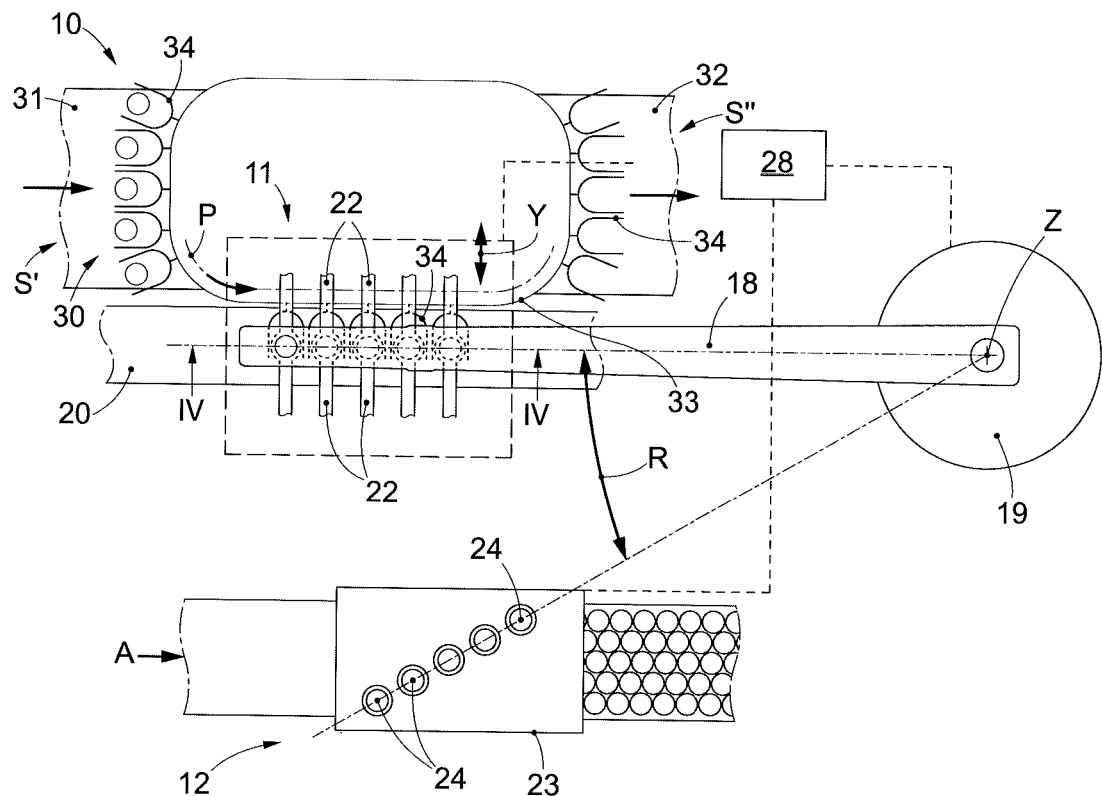
FIG. 1 is a schematic top view of an apparatus for producing closing systems for containers according to some embodiments described here.

The embodiments described here with reference to the attached FIG. 1 concern an apparatus for producing a closing system for containers, which is indicated as a whole with reference number 10.

In order to better understand the inventive concept of the present invention, before describing the apparatus 10 and the corresponding method in detail, we will now describe an example of a closing system that can be produced using the apparatus 10, it being understood that the present invention is not limited to this example and that the invention can be used to process many other types of closing systems, of a type already known or which will be developed in the future.

With reference to FIGS. 5A-5C, below we describe, by way of a non-limiting example, a closing system that can be produced by means of the apparatus 10. In these drawings, the closing system, which hereafter is also called "cap" for the sake of brevity, is indicated as a whole with reference number 100.

Each cap 100 comprises an anti-tampering strip 101 and a closing body 102, or lid, connected to the anti-tampering strip 101 by means of a plurality of frangible elements 103 able to break when the container is first opened. Preferably, the closing body 102 is hinged to the anti-tampering strip 101 along a hinging zone 111, so that it can rotate between an opening position (FIG. 5C), in which it is moved away from the anti-tampering strip, and a closing position (FIGS. 5A and 5B), in which it is coupled to the anti-tampering strip 101. In this way, the closing body 102 is never completely detached from the anti-tampering strip, so as to prevent the unwanted dispersion of these components in the environment.

Each frangible element 103 is interposed between two slits 104 which are interposed between the anti-tampering strip 101 and the closing body 102. The alternating sequence of frangible elements 103 and slits 104 extends substantially along the entire perimeter of the cap 100, with the exception of the hinging zone 111.

The closing body 102 comprises a lateral wall 105 and a bottom wall 106, which during use is able to be disposed directly above the mouth of the container.

A sealing lip 107 with a circular shape is created on the bottom wall 106, which during use projects from the closing wall 106 toward the mouth of the container so as to hermetically close the latter thanks to the cooperation with a corresponding top annular edge, not shown, made on the neck of the container.

The cap 100 comprises a barrier element 108, for example made of aluminum and with a circular shape. The barrier element 108 is surrounded by the sealing lip 107.

A first adhesive layer S1 is provided (FIG. 3), configured to allow the barrier element 108 to be attached to the closing body 102, in particular to its bottom wall 106.

In some embodiments, which can also be obtained by means of the apparatus 10 and the method described here, a second adhesive layer S2 is also provided (FIGS. 3, 5A, 5B) configured to allow the subsequent adhesion of the barrier element 108 to another barrier element, not shown, disposed on the mouth of the container in order to close it hermetically.

The anti-tampering strip 101 comprises a flexible annular portion 109, configured to be folded back inside the cap 100, that is, toward the internal side of the closing body 102, as indicated schematically by the arrows F in FIG. 5A. To allow the flexible annular portion 109 to be folded back toward the inside, a pre-formed intended folding line 110 is provided, which separates it from the remaining portion of the anti-tampering strip 101.

Thanks to the folded back conformation of the flexible annular portion 109, the anti-tampering strip 101 remains anchored to the neck of the container, even after the first opening, without the risk of it being dispersed into the environment, polluting it. In addition, the fact that the anti-tampering strip 101 remains associated with the container even during use, allows it to be sent to the correct differentiated disposal, together with the container and the closing system, facilitating the disposal operations to be carried out by the user.

The apparatus 10 comprises a transport system for the caps 100, which is indicated with reference number 30 and is configured to transport the caps 100 along a feed path P, which extends between an inlet station S' and an outlet station S" (FIG. 1). The inlet station S' is configured to receive the caps 100, for example disposed in bulk or aligned in an orderly manner, from a feed element 31 that feeds the caps 100. The outlet station S" is, on the other hand, configured to release the caps 100 to a suitable outlet element 32 which moves the caps 100 away from the apparatus 10. In the example shown in FIG. 1, the elements 31, 32 are for example configured as horizontal or slightly inclined planes equipped with suitable means, for example vibrating or suchlike, to determine the feed of the caps 100 in the sense indicated by the arrows.

In the example provided here, the transport system 30 is configured as a conveyor 33, for example of the belt or chain type, to which a plurality of gripping units 34 (FIG. 1) for gripping the caps 100 are attached. By way of a non-limiting example, the gripping units 34 are configured as selectively openable and re-closable pliers or jaws, so that each one can respectively release or hold a respective cap 100.

Figure 2:
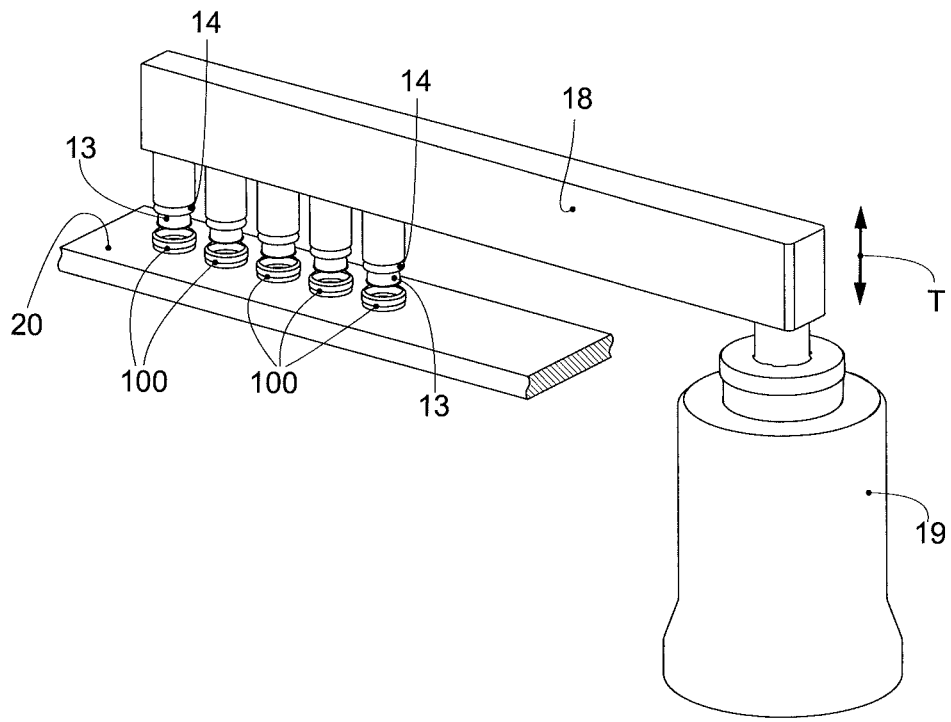
FIG. 2 is a schematic perspective view of a portion of the apparatus of FIG. 1.

The apparatus 10 (FIGS. 1 and 2) comprises a welding and deformation station 11 in correspondence with which both the welding of the barrier element 108 to the closing body 102 and also the folding of the flexible annular portion 109 back toward the inside occur, as will be described in greater detail below with particular reference to the operating sequence shown in FIGS. 4A-4D. The welding and deformation station 11 is disposed along the feed path of the caps 100, in a position such as to be interposed between the inlet station S' and the outlet station S".

The apparatus 10 also comprises a forming station 12 configured to shear a sheet of material A, in a manner that will be described in greater detail below with reference to FIG. 3, in order to produce the barrier elements 108. The forming station 12 is in particular configured to produce barrier elements 108 in aluminum, laminar, with a shape and sizes correlated to those of the closing body 102.

The apparatus 10 comprises a manipulation member 13 of the barrier element 108 and a deformation member 14 configured to act on the flexible annular portion 109 of the anti-tampering strip 101. As will be described in greater detail below, in relation to the description of the method according to the present invention, the manipulation member 13 attaches the barrier element 108 onto the closing body 102 and the deformation member 14 folds back the flexible annular portion 109 in correspondence with a same predetermined position, in the welding and deformation station 11.

The manipulation member 13 comprises a head 15 provided with one or more ducts 16 connected to a suction system, so that the head 15 is able to temporarily hold a respective barrier element 108 by suction.

The deformation member 14 is shaped as an annular deformation element provided with a folder edge 17, which is also annular, configured to contact the flexible annular portion 109 in order to fold it back inside the cap 100.

As better visible in FIGS. 3 and 4A-4D, the deformation member 14 is disposed around the manipulation member 13.

Specifically, the deformation member 14 and the manipulation member 13 develop coaxially with respect to each other around a common longitudinal axis X, and they are mobile with respect to each other in a direction parallel to such longitudinal axis X.

The deformation member 14 and the manipulation member 13 are mounted on a common support arm 18 which is mobile in such a way as to alternatively take the deformation member 14 and the manipulation member 13 into the welding and deformation station 11 and into the forming station 12.

The apparatus 10 comprises actuator members 19, of a type known in the state of the art or which will be developed in the future, such as for example electric motors, which are associated with the mobile arm 18 to determine the movement of the latter.

In particular, the mobile arm 18 performs a rotation movement, indicated by the arrow R in FIG. 1, around an axis of actuation Z. Furthermore, the mobile arm 18 also performs a translation movement T in a vertical direction, parallel to the longitudinal axis X, as indicated by the corresponding arrow in FIG. 2.

The apparatus 10 also comprises a support plane 20 configured to receive the caps 100 resting on it.

In particular, the support plane 20 extends for a segment of the feed path of the caps 100, in correspondence with the welding and deformation station 11.

One or more electromagnetic induction coils 21 (FIGS. 4A-4D) are disposed in proximity to the support plane 20, configured to attach the barrier element 108 to the closing body 102 by means of induction welding when the barrier element 108 is placed in contact with the closing body 102 and kept pressed against the latter by the manipulation member 13.

Preferably, the electromagnetic induction coils 21 are disposed immediately below the support plane 20, for example at an indicative distance of a few millimeters from such plane, in particular of about 2 or 3 millimeters.

In this way, the force lines of the magnetic field generated by the electromagnetic induction coils 21 strike the barrier element 108, and in particular the first layer of adhesive substance S1 which has to be activated, with high intensity, such as to allow a firm attachment of the barrier element 108 onto the closing body 102 by induction welding, in extremely short welding times.

The support plane 20 is made of heat-resistant, non-magnetic plastic or metal materials, such as for example PEEK, Teflon, titanium coated with a non-stick coating, such as Teflon or suchlike.

Preferably, the head 15 for holding the barrier element 108 is also made with the same type of material as the support plane 20, such as for example those listed above.

This allows to prevent the support plane 20 and the head 15 from overheating by convection or radiation during the functioning of the apparatus 10, due to the heat generated in correlation to the magnetic field originating from the electromagnetic induction coils 21.

The apparatus also comprises one or more centering members, indicated schematically by reference number 22 in FIG. 1, disposed in correspondence with the welding and deformation station 11, and each configured to laterally clamp a respective cap 100, at least while it is stationary in the same predetermined position described above, so that the cap 100 is centered with respect to the longitudinal axis X. In the example provided here, ten centering members 22 are provided, organized into two groups of five centering members 22 acting from opposite sides of the caps 100, please see the plan view of FIG. 1. In particular, five centering members 22 are disposed on one side with respect to the longitudinal axes X, and the other five centering members 22 are disposed on the opposite side with respect to such axes.

In the example in question, a group of five centering members 22 is mobile toward and away from the longitudinal axis X, for example the one disposed above the longitudinal axis X, as indicated by the arrows Y in FIG. 1, in order to selectively clamp or release the caps 100. In other variants, not shown, it can be provided to move all the centering members with respect to the longitudinal axis X.

In the example provided here, the welding and deformation station 11 comprises five manipulation members 13, configured to manipulate as many barrier elements 108, and five deformation members 14, all supported by the same support arm 18. In this way, the welding and deformation station 11 is able to process five caps 100 at the same time. Since the number of centering members 22 is correlated to the number of members 13, 14; in this case, two rows of five centering members 22 are provided, so that the two rows act on the caps 100 from opposite sides.

It is quite clear that, in other embodiments, not shown, the welding and deformation station 11 is configured in such a way as to comprise a different number of manipulation members 13 and deformation members 14, and consequently also of centering members 22.

The forming station 12 is also configured in such a way as to simultaneously shear a plurality of barrier elements 108. Preferably, the forming station 12 is configured in such a way as to simultaneously shear a number of barrier elements 108 equivalent to the number of caps 100 simultaneously processed in the welding and deformation station 11, that is, five barrier elements 108 in the example shown in the attached drawings.

As shown in FIG. 1, the barrier elements 108 sheared simultaneously in the forming station 12 are disposed along an oblique line, that is, inclined, with respect to a direction of feed of the sheet of material A from which the barrier elements 108 are sheared.

With reference to FIG. 3, the forming station 12 comprises a plate 23 provided with one or more through holes 24, each configured to be passed through by a respective barrier element 108. The holes 24, with a circular shape, have a diameter substantially equal to that of the barrier elements 108 and preferably have a slight upward flaring, that is, in the exit direction of the sheared barrier element 108.

The forming station 12 also comprises a shearing punch 25 vertically mobile in a bi-directional manner, to shear a corresponding barrier element 108.

The shearing punch 25 comprises at least one suction duct 26 suitable to connect the active surface of the shearing punch 25 that shears the barrier element 108 with a suction system.

The forming station 12 also comprises a clamping member 27 configured to selectively clamp the sheet of material A against the plate 24, at least while the shearing punch 25 performs the shearing. In order to do this, the abutment element 27 is also vertically mobile, in a bi-directional manner, parallel to the direction of movement of the punch 25.

The apparatus 10 also comprises a programmable control unit 28, schematized in FIG. 1, which is configured to command at least the functioning of the manipulation members 13 and the deformation members 14 in a coordinated manner. More specifically, the control unit 28 is programmed in such a way as to also control the functioning of the actuator members 19 that command the movement of the support arm 18, and that of the forming station 12 in a reciprocally coordinated manner.

The method to produce closing systems 100 in accordance with the teachings of the present invention is described below, with particular reference to FIGS. 3 and 4A-4D.

Initially, the support arm 18 takes the manipulation members 13 above the forming station 12.

Here, the support arm 18 is lowered to allow the manipulation members 13 to receive the barrier elements 108 sheared from the sheet of material A.

In order to shear the barrier elements 108, first the clamping members 27 move upward, so as to temporarily clamp the sheet of material A against the plate 23. While the sheet of material A is kept clamped, the punches 25 also move upward and penetrate inside a respective hole 24 in order to shear the barrier elements 108. It should be noted that the latter are held resting on the punch 25 by suction, thanks to a suction flow through the suction duct 26, they are moved toward a corresponding manipulation member 13.

When the barrier element 108 is released by the punch 25 to the head 15 of the manipulation member 13, the suction action that holds the barrier element on the punch 25 ceases, and the suction action that allows the head 15 to hold the barrier element 108, thanks to the presence of the suction ducts 16, is activated.

Figure 4A:
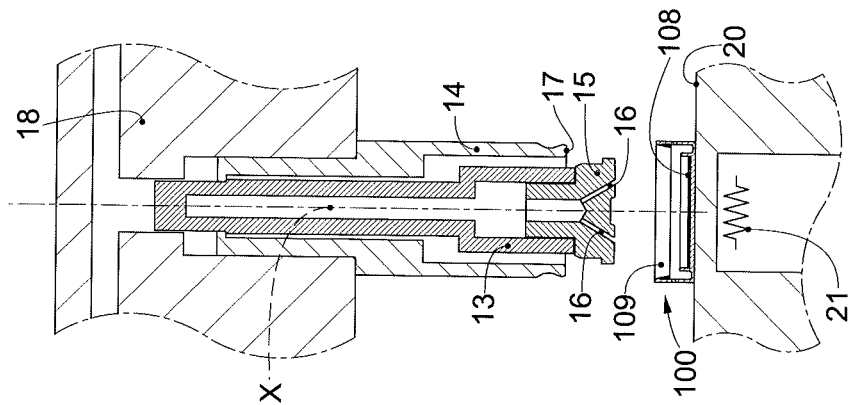
FIGS. 4A-4D are schematic section views, taken along the tracing plane IV-IV shown in FIG. 1, which show an operating sequence of successive processing steps comprised in the method to produce closing systems according to the present invention.

Subsequently, the support arm 18 takes the manipulation members 13, the heads 15 of which are holding respective barrier elements 108, above the welding and deformation station 11 (FIG. 4A).

Figure 4B:
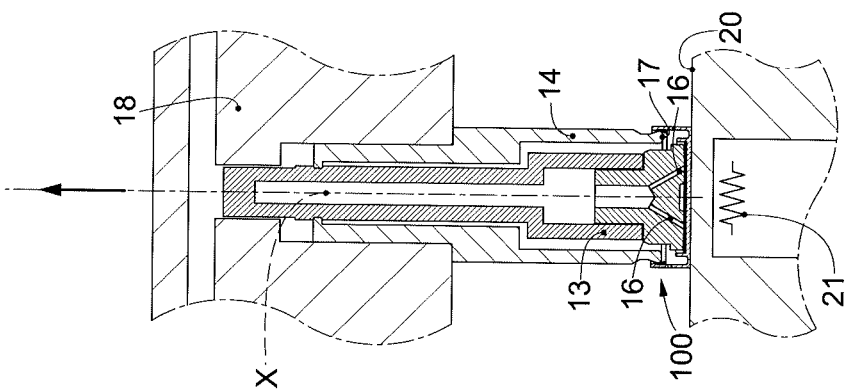

Subsequently, the support arm 18 is lowered until the head 15 takes the barrier element 108 to rest on the bottom wall 106, and presses it against the closing body 102 in order to attach it to the latter (FIG. 4B).

Figure 4C:
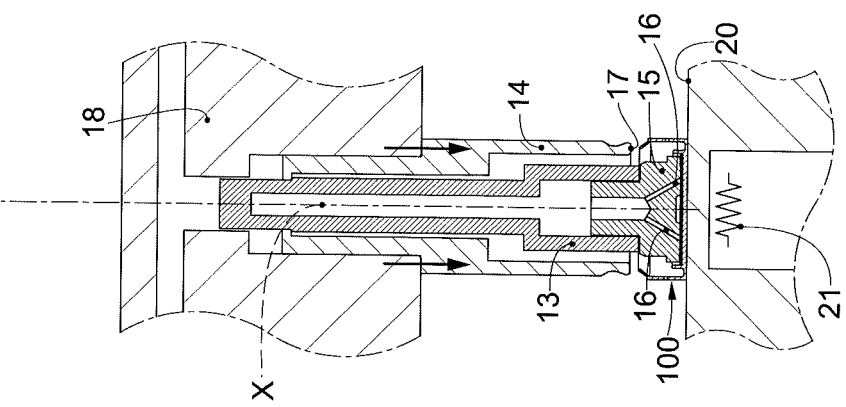
Figure 4D:
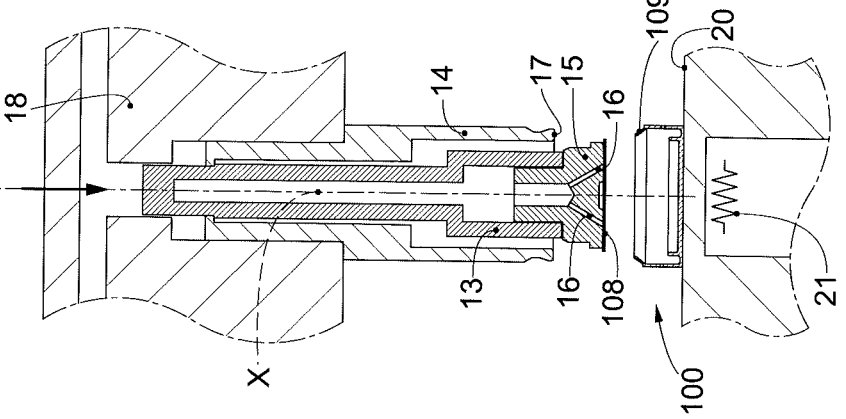

Subsequently, the support arm 18 continues its downward movement so as to cause the deformation members 14 to lower until coming into contact with the flexible annular portion 109 and fold it back toward the inside of the cap 100 (FIG. 4C). Please note that in this condition the manipulation member 13 is retracted, so that the head 15 is at least in partly inside the deformation member 14.

Furthermore, at least in the condition shown in FIGS. 4B and 4C, the electromagnetic induction coils 21 are activated to determine the welding of the barrier element 108 onto the closing body 102 thanks to the activation of the first layer of adhesive substance S1. This type of welding, as stated, advantageously allows to prevent activating the second layer of adhesive substance S2 in order not to compromise its subsequent adhesive action at the time of connection with the other barrier element placed so as to close the mouth of the container.

The person of skill in the art will easily understand that the electromagnetic induction coils 21 are activated according to a pulsed mode, known in the state of the art, which makes their use compatible with the very short cycle times and the high operating speeds that the apparatus 10 functions at.

Finally, the support arm 18, and with it the manipulation members 13 and the deformation members 14, moves upward (FIG. 4D) after the barrier element 108 has been attached onto the closing body by means of induction welding and the flexible annular portion 109 has been folded back, in order to return toward the forming station 12. More specifically, in a preferred embodiment, at first it is provided that the deformation members 14 retract upward while the manipulation members 13 are still in contact with the barrier element 108, in order to prevent the deformation members 14 from extracting the closing body 102 from the gripping unit 34. Subsequently, the manipulation members 13 are also moved upward with a relative movement with respect to the deformation members 14, in fact sliding inside the latter. One or more elastic elements can be provided, such as for example springs, not shown, to cushion the upward movement of the manipulation members 13.

Thereafter, the caps 100 leave the welding and deformation station 11 and continue along their feed path.

It is then provided to repeat the processing steps described above cyclically.

It is clear that modifications and/or additions of parts or steps may be made to the apparatus 10 and method as described heretofore, without departing from the field and scope of the present invention as defined by the claims.

In the following claims, the sole purpose of the references in brackets is to facilitate reading and they must not be considered as restrictive factors with regard to the field of protection claimed in the specific claims.

The invention claimed is:

1. Apparatus for producing a closing system for containers comprising an anti-tampering strip and a re-closable closing body, said apparatus comprises:
    a forming station configured to form barrier elements starting from a sheet, wherein the barrier elements are laminar, with a shape and sizes correlated to those of said closing body;
    a transport system comprising at least one gripping unit configured to hold said closing system and to move along a feed path, which extends between an inlet station and an outlet station;
    a welding and deformation station disposed along said feed path between the inlet station and the outlet station;
    a manipulation member configured to pick up said barrier element in said forming station and take it in said welding and deformation station and subsequently attach said barrier element to the closing body;
    a deformation member configured to be drivable between an inactive position, distant from the closing system, and a work position in which it presses into contact onto a flexible annular portion of said anti-tampering strip in order to fold it back inside said closing system wherein said deformation member is shaped as an annular deformation element disposed around said manipulation member, wherein said deformation member and said manipulation member develop coaxially with respect to each other around a common longitudinal axis, and are mobile with respect to each other in a direction parallel to said longitudinal axis; and
    a control unit connected to said manipulation member and to said deformation member and programmed to command at least the functioning of said manipulation member and of said deformation member in a coordinated manner, so that they respectively attach said barrier element onto said closing body and exert a pressure on said flexible annular portion in said welding and deformation station while said gripping unit is stationary in a same predetermined position holding said closing system.

2. Apparatus as in claim 1, wherein it comprises a support plane for said closing systems, disposed in said welding and deformation station, and in which, in the proximity of said support plane, there are disposed electromagnetic induction welding means, configured to attach said barrier element to said closing body by means of induction welding, when the barrier element is placed in contact with the closing body and kept pressed against the latter by said manipulation member.

3. Apparatus as in claim 2, wherein said support plane, and possibly a head of said manipulation member, are made of heat-resistant, non-magnetic plastic or metal materials, selected from a group consisting of: PEEK, Teflon, titanium coated with a non-stick material.

4. Apparatus as in claim 1, wherein it comprises one or more centering members disposed in correspondence with said welding and deformation station, and each configured to laterally clamp a respective closing system at least while it is stationary in said same predetermined position.

5. Apparatus as in claim 1, wherein it also comprises a support arm configured to move said manipulation member and said deformation member between said forming station and said welding and deformation station.

6. Apparatus as in claim 5, wherein said manipulation member and said deformation member are attached on said support arm.

7. Apparatus as in claim 1, wherein said manipulation member is also configured to hold said barrier element by suction during the movement from said forming station to said welding and deformation station.

8. Apparatus as in claim 1, wherein said forming station is configured to simultaneously form a plurality of said barrier elements, which are disposed along a line that is oblique with respect to a direction of feed of the sheet from which said barrier elements are obtained.

9. Apparatus as in claim 1, wherein said forming station comprises one or more clamping members configured to temporarily clamp the sheet from which said barrier elements are obtained at least during said forming operation, and one or more shearing punches, mobile with respect to said clamping members, and configured to shear said barrier elements and hold the latter resting on them by suction, and to move them toward said manipulation member.

10. Method to produce a closing system for containers comprising an anti-tampering strip and a re-closable closing body, wherein said method comprises the steps of:
    forming, in a forming station, starting from a sheet, a barrier element with a shape and sizes correlated to those of said closing body;
    transporting a plurality of said closing systems along a feed path, which extends between an inlet station and an outlet station;
    picking up a barrier element from the forming station by means of a manipulation member,
    taking the barrier element picked up in said forming station toward a welding and deformation station disposed along said feed path between the inlet station and the outlet station;
    welding said barrier element to said re-closable closing body in said welding and deformation station, by means of said manipulation member, wherein said welding step provides to attach said barrier element to an internal wall of the closing body in a stable manner,
    shaping at least one flexible annular portion of said anti-tampering strip in said welding and deformation station by means of a deformation member shaped as an annular deformation element and disposed around said manipulation member, so as to fold said flexible annular portion back inside said closing system],
    wherein it is provided that said manipulation and deformation members develop coaxially with respect to each other around a common longitudinal axis, and are mobile with respect to each other in a direction parallel to said longitudinal axis for respectively attaching said barrier element onto said closing body and exerting a pressure on said flexible annular portion while said closing system is stationary in a same predetermined position in said welding and deformation station.

11. Method as in claim 10, wherein said manipulation member holds said barrier element by suction when it takes the barrier element picked up in said forming station toward said welding and deformation station.

12. Method as in claim 10, wherein the attachment of the barrier element to the closing body by said manipulation member occurs while the flexible annular portion is folded back into the closing system by said deformation member.

13. Method as in claim 10, wherein the attachment of the barrier element to said internal wall of the closing body occurs by means of electromagnetic induction welding.

14. Method as in claim 10, wherein said closing body is hinged to the anti-tampering strip along a hinging zone, so as to be rotatable between an opening position, in which it is moved away from the anti-tampering strip, and a closing position, in which it is coupled to the anti-tampering strip, without ever completely detaching from the anti-tampering strip.

15. Apparatus as in claim 1, wherein the manipulation member and the deformation member are guided coaxially along a common longitudinal axis, and wherein the control unit is programmed to initiate deformation only after attachment of the barrier element is completed.

16. Apparatus as in claim 1, wherein the annular deformation element has a circular cross-section and is configured to apply uniform radial pressure onto the flexible annular portion of the anti-tampering strip.

* * * * *